June 12, 1951 P. DENES 2,556,257
METHOD FOR MANUFACTURING ELECTRIC CONDENSERS
Filed July 26, 1947 2 Sheets-Sheet 1
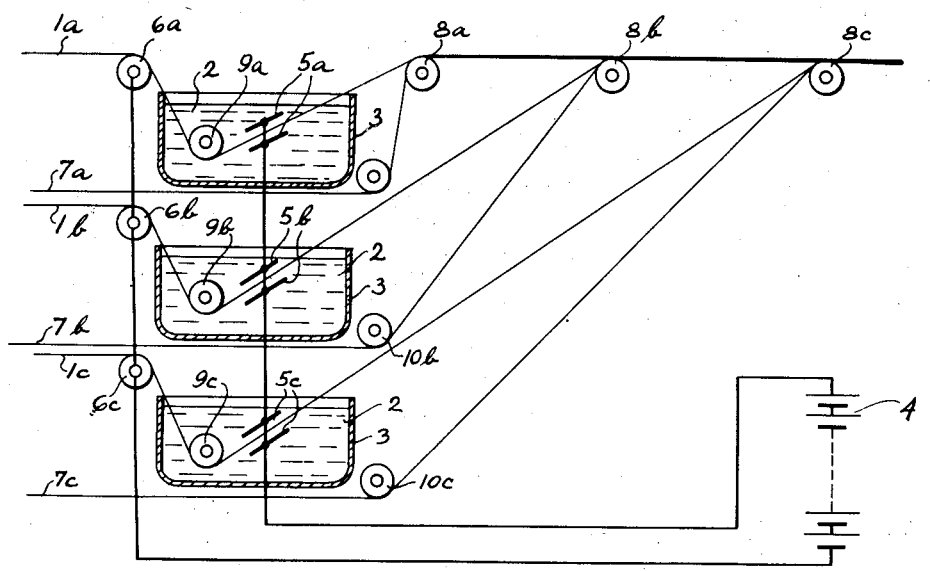
FIG. 1.
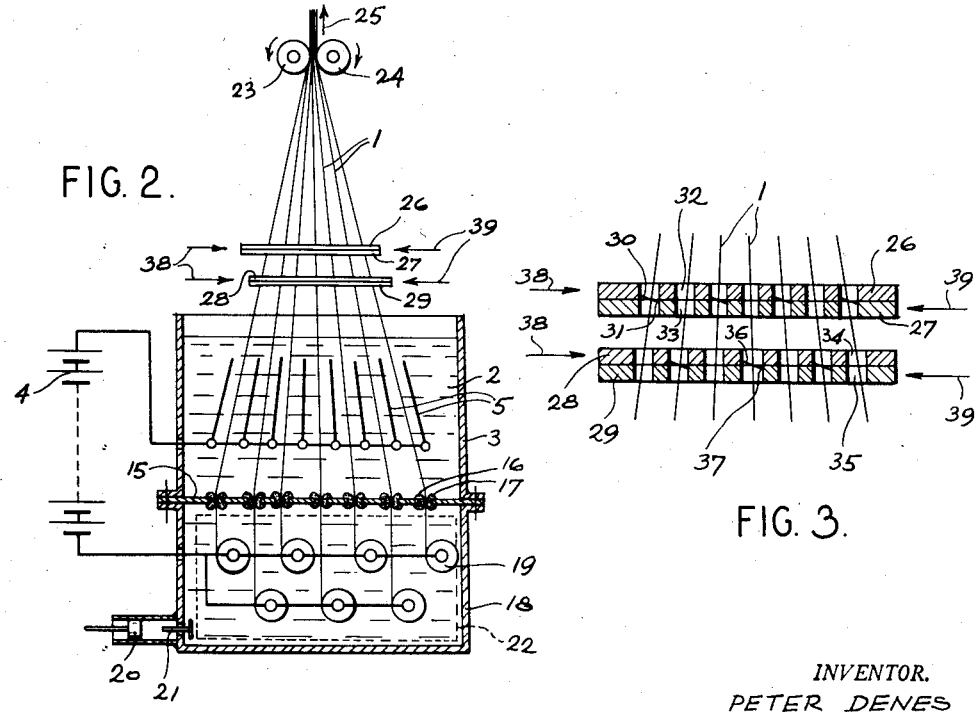
FIG. 2.
FIG. 3.
INVENTOR.
PETER DENES
BY Mock + Blum
ATTORNEYS.

June 12, 1951 P. DENES 2,556,257
METHOD FOR MANUFACTURING ELECTRIC CONDENSERS
Filed July 26, 1947 2 Sheets-Sheet 2
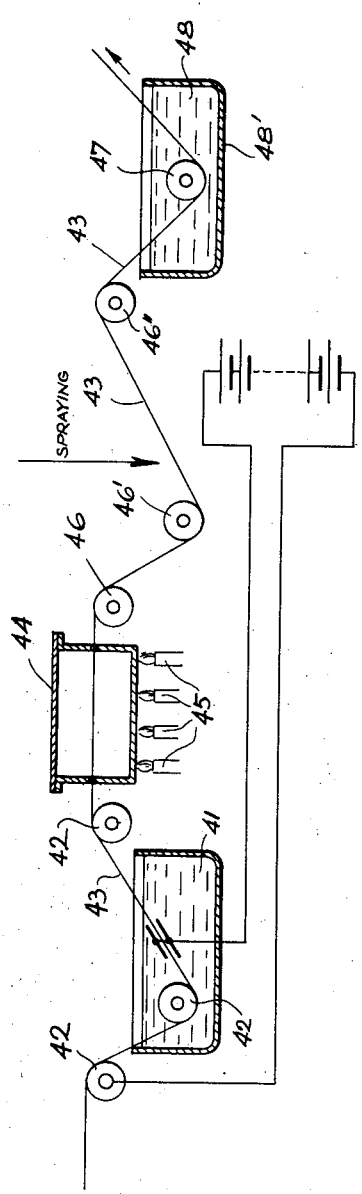
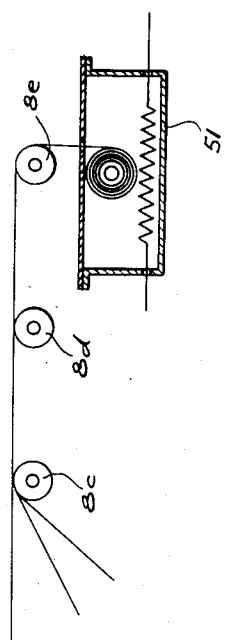
INVENTOR.
PETER DENES
BY Mock + Blum
ATTORNEYS.

Patented June 12, 1951

2,556,257

UNITED STATES PATENT OFFICE 2,556,257

METHOD FOR MANUFACTURING ELECTRIC CONDENSERS

Peter Dénes, Budapest, Hungary

Application July 26, 1947, Serial No. 764,001
In Hungary July 31, 1942

Section 1, Public Law 690, August 8, 1946
Patent expires July 31, 1962

1 Claim. (Cl. 154—80)

This invention relates to a method for the manufacture of condensers which consists in coating the metallic condenser foil with a layer of finely distributed ceramic material of a sintering temperature lower than the melting point of the metal foil and in sintering together the metal foil and the said ceramic layer.

Condensers with metallic armatures separated by an insulating layer of ceramic material are known. The particles of these ceramic materials are sintered in a known manner, after they have been formed, and conjoin in this way to a continuous solid body. The dimensions of ceramic bodies, manufactured in the described manner, are selected so as to bear safely all mechanical stresses in the course of their manufacture, mounting and use, so that their dimensions are defined merely by mechanical viewpoints, in consequence of which fact the thickness of the ceramic layer has generally to be greater than that required by electrical considerations. When manufacturing e. g. a normal-voltage high-capacity condenser fairly big surfaces are to be chosen with respect to the small thickness of 0.3 mm. required by mechanical considerations so that finally the condenser obtained in this way proves to be too large and in consequence too expensive.

For diminishing the thickness of the ceramic layer methods of manufacture have been suggested, according to which on a core of ceramic material, alternately, there are applied thin metal foils and layers of ceramic glaze or frit which were glowed at a muffle-furnace temperature. This method, however, relates definitely to frit or ceramic filling-in materials embedded into enamel sintering on a low temperature whereby this method is—with regard to the low dielectric constant of enamel—at best suitable but for the manufacture of high-frequency condensers and not for that of microfarad condensers of big capacity, not to mention the complications arising from repeated glowing which render this method quite unfit for mass production.

The condenser according to the invention has an insulating layer consisting exclusively of ceramic materials. The thickness of this layer is defined by electrical requirements only, the necessary mechanical strength being exclusively ensured by metal armatures. In contradistinction to enamels consisting of undercooled liquids of low dielectric constant the use of ceramic materials, especially that of crystalline metal oxides, e. g. that of rutile or mixtures containing rutile results in obtaining insulating layers of high dielectric constant. Of course, other known ceramic materials may also be added in order to alter physical constants as e. g. temperature coefficient, sintering temperature, breakdown voltage, dielectric constant, loss angle etc.

According to the invention the connection between the insulating layer and the metallic condenser foil—metal plate or metal ribbon—grows quite solid and in view of the small thickness of the ceramic layer advantageously not exceeding 0.1 mm. metal and layer form together an elastic body capable to satisfy all mechanical and thermical requirements completely. The thickness of the insulating layer may be reduced almost at will, respectively as far as this may be admitted by electrical requirements. The method according to the invention enables to manufacture cheap condensers of small dimensions especially as the coating of the metal plates and metal ribbons with finely distributed ceramic material as well as glowing but once the final product gives possibilities for simple and cheap mass production.

The solid connection between the metal ribbon and the ceramic layer excludes the formation of bubbles which would deteriorate electrical properties.

Generally all known ceramic materials may be used. Yet—owing to its high dielectric constant—it is advisable to employ rutile or mixtures containing the same to a high degree.

When selecting the suitable metal care is to be taken of its melting point which has to be higher than the sintering temperature of the ceramic material. In view of its low magnetic permeability and because it may be rolled very thin /0.002 mm./, nickel is especially suitable, besides e. g. iron, cobalt, chromium etc. and their alloys may be applied too in order to diminish the permeability.

The finely distributed ceramic layer may be applied to the metal ribbon or metal plate according to methods already known per se. In this connection electrophoresis is to be mentioned since uniform and suitable coatings may be obtained by using it. However, spraying etc. may be applied too.

In order to prevent oxidation of the metal parts the sintering may take place in vacuum. To this end glowing may be effected in neutral or reducing atmosphere at normal or at reduced pressure.

According to one modification of the invention the sintering may be effected at an increased pressure in neutral or reducing atmosphere since high pressure accelerates sintering, besides the adhesion between the metal and the ceramic parts will be also more perfect.

According to another modification a certain quantity of oxygen, amounting e. g. to 4%, is to be mixed to the neutral or reducing gas. This quantity is to be chosen in such a manner that the metal parts should not oxidize too highly. The aim of applying oxygen is to prevent the reduction of the ceramic parts, further to promote sintering and to obtain perfect adhesion between metallic and ceramic parts by means of oxidizing metal surfaces.

The invention relates further to a device for the manufacture of condensers by electrophoresis, comprising one or more basins filled with the suspension of a ceramic material, through which basin the metal ribbon to be coated shall be conducted between anodes.

In the drawing hereto annexed:

Figure 1 is a schematic view of an example of the device with three basins.

Figure 2 is a schematic view of an example of the device with a single basin.

Figure 3 is a sectional view of a part of Figure 2 i. e. of a perforating instrument in an enlarged scale.

Fig. 4 illustrates diagrammatically the process in which a single metal foil is coated with a ceramic, the coated foil is sintered and subsequently provided with a second metal foil which is covered with a protecting layer, and Fig. 5 illustrates diagrammatically the formation of a coil from assembled coated and bare metal ribbons, and the coating and sintering of the coil.

The armature of the condenser is constituted on the one hand by the metal ribbons $1a$, $1b$, $1c$ which are conducted through the basins 3 by guiding rollers $9a$, $9b$, $9c$ the basin itself being filled with a suspension of ground ceramic material 2. The current source 4 is connected to twin anodes $5a$, $5b$, $5c$ and to rollers $6a$, $6b$, $6c$ which latter guide the ribbons $1a$, $1b$, $1c$. By means of electrophoresis a ceramic insulating layer, the thickness of which may be regulated with appropriate accuracy, will be deposited on the metal ribbons $1a$, $1b$, $1c$.

Further metal ribbons $7a$, $7b$, $7c$ which may be narrower than the ribbons $1a$, $1b$, $1c$ are placed between these latter in a bare state i. e. without being coated with any ceramic insulating layer. The ribbons $7a$, $7b$, $7c$ separate the ribbons $1a$, $1b$, $1c$ from the guide rollers $8a$, $8b$, $8c$ which might hurt their coating.

After having left the roller $8c$ the ribbons get wound up according to known methods for the manufacture of paper condensers. According to known methods the winding may be effected in two directions in order to diminish inductivity. The sides of the ready coil will be covered by a ceramic insulating layer by means of electrophoresis or by some other known method. Thereafter the coil is—as already mentioned—to be sintered in an oven in vacuum in reducing or neutral gas as well as in the presence of some oxygen.

Instead of three or more basins also a single but deeper one may be used in which case the coils of the bare ribbons $7a$, $7b$, $7c$ are located to the right of the common basin 3 and the ribbons are guided by rollers $8a$, $8b$ and $8c$.

The device shown in Figures 2 and 3 contains also a single basin 3. The openings on its bottom 15 are closed by means of felt strips 16, 17 of bow-shaped cross-section between which the metal ribbons 1 wound off from the coils 19 are guided from the air-tight chamber 18 into the basin 3. The purpose of the approximately vertical conduction of the metal ribbon is—in contradistinction to their horizontal path according to Figure 1—the elimination of the guiding rollers and in this way that of the danger of hurting the coating of the metal ribbons. Among the metal ribbons 1 the second, fourth and sixth ones etc. are narrower without any necessity of their being bare since there are no guiding rollers existing at all.

The air pressure of the chamber 18 may be increased as required, e. g. by means of the piston 20 through the return valve 21. Increased pressure is applied in order to avoid the trickling of the liquid. For changing the coils the chamber 18 is provided with the air-tight door 22. The anodes 5 are arranged between the ribbons so as to converge like these. One pole of the current source 4 is connected to the anodes 5 and the other one to the coils 19. The ribbons 1 are united between the transporting cylinders 23, 24 which latter promote the ribbons in the direction denoted by the arrow 25. It is advisable that at the same time these cylinders shall exert a pressure to the ribbons to compact thereby the insulating layer in order to obtain a higher dielectric constant and a better electrical insulating.

Figure 3 shows a perforating instrument in an enlarged scale. It consists of plates 26, 27 and 28, 29 provided with openings 32, 33 and 34, 35 respectively through which the ribbons 1 are conducted. Into the openings 32 the perforating pin 30 is placed cooperatively with the perforating pin 31 placed into the opening 33. The construction of the plates 28, 29 is identical with that of 26, 27 with the difference, however, that the pins 30, 31 are placed only into the openings 32, 33 of odd numbers whereby the pins 36, 37 are placed into the openings of even numbers of the plates 28, 29.

As it is shown in Figure 3, during the process of electrophoresis the plates 26, 27, 28, 29 are not in moving condition and the cooperating pairs of pins 30, 31 and 36, 37 respectively do not get into contact with the metal ribbons 1. After the desired length of coating on the metal ribbons is arrived, the current circuit 4 gets interrupted and the cylinders 23, 24 stop, at the same time the plates 26, 28 get pushed in the direction denoted by the arrow 38 and the plates 27, 29 in that of the arrow 39. In consequence of this movement the perforating pins effect a tiny circular or lancet-shaped perforation into the metal ribbons 1. Owing to this operation this section of the metal ribbons 1 gets weakened though still remaining strong enough not to be torn by tractive power after the renewed function of the cylinders 23, 24.

After the perforation has been effected the plates 26, 27, 28, 29 regain their original position. The current source gets switched on again and the cylinders 23, 24 turn on as long as the perforated cross-section passes the cylinders 23, 24. Then the cylinders 23, 24 stop again, the winding of the ribbon is, however, still going on. In consequence of the thus arising tractive power the ribbons get torn along the perforation line. The aim of this process is to avoid the wearisome and complicated setting in of ribbons 1 between the cylinders 23, 24 when manufacturing the following condenser. The reason for why perforation takes place in two separate heights is that for to increase insulation at the ends the end of each second further ribbon has to project from the ribbon bundle for the purpose of conjoining their metal contacts by means of soldering, welding, or by some other suitable means, after having removed the insulation layer from their ends.

In contradistinction to the construction shown on Figure 3 the perforating instrument may be placed below the electrodes in basin 3 or also in the chamber 18, or there may be used ribbons perforated in previously defined lengths too. If the distance between the cylinders 23, 24 and the perforating instrument is smaller than 1 meter it is advisable to use bow-shaped perforating plates instead of plane ones, the centre of which curved plates is the point of contact of the cylinders 23, 24.

In the region of perforation it is advisable to provide the metal ribbons with a thicker insulating layer in order to balance the deleterious effect of the perforating pins. A simple method for this is to increase the cataphoreting current to the required extent when these parts pass by between the anodes 5.

The felt strips 16, 17 with the openings of the bottom 15 may be omitted if the coils 19 are placed in the basin 3 itself yet in a suitable distance from the anodes 5 whereby it is to be mentioned that in this case the coils are to be screened electrostatically in order to prevent superfluous coating. Finally, the coils 19 may be placed above the basin 3 also in which case the ribbons wound off are first to be directed towards the bottom of the basin by means of guiding rollers in order to enable the ribbons to pass by vertically—without further guiding rollers—between the anodes 5. In this way the danger of the guiding rollers touching readily coated ribbons is completely prevented, any undesired coating of the coils 19, besides, being also impossible.

Figure 4 illustrates diagrammatically the process for manufacturing electric condensers in which first a coating is electrophoretically applied to metal foil 43 in the bath or suspension 41, said foil being conducted over guides 42 to a device 44 heated by burners 45 to sintering temperature. The coated foil is caused to pass through device 44, in which it is subjected to sintering and is then conducted over guides 46, 46' and 46'' and 47. Between guides 46' and 46'' another narrower metal layer is deposited by spraying on the sintered ceramic layer of metal foil 43 and finally the second metallic layer is provided with a protective layer in bath 48.

Figure 5 illustrates diagrammatically the steps of forming a coil from assembled coated and bare metal ribbons and the coating and sintering of the coil. In this figure, 8c indicates the guide roller shown on the right in Figure 1, over which the coated and bare metal ribbons assembled in the manner shown in Fig. 1 are conducted. These assembled elements are conducted over guide rollers 8d and 8c into a heating device 51, in which they are formed to a coil, subjected to sintering by heating to the necessary temperature. The sides of the coil formed are coated by finely distributed ceramic material by spraying means not shown in Fig. 5.

The condenser according to the invention may be manufactured also in such a way that there is not more than a single ribbon to be coated by ceramic insulating material by means of electrophoresis, the second armature being applied by cathodic dispersion, by spraying or by means of another method in the form of a thin metal layer after the first ceramic layer has already been sintered.

Another suitable execution of the scope of the invention especially suitable for mass production of low capacity condensers is that a metal plate being provided with a metal contact is to be provided cataphoretically with a ceramic insulating layer, then sintered and after that the second armature is to be applied in the form of a metal layer in order to secure a suitable insulation in such a way that the dimensions of the metal layer have to be everywhere less than those of the ceramic one. Now, the second layer is to be provided with a contact and with a protecting layer. To avoid arcing over on the sides the ceramic insulating layer may be made thicker at the borders.

I claim:

In a method of manufacturing electric condensers, the steps of electrophoretically coating both sides of a plurality of metal ribbons to be applied as condenser armature with a finely distributed unfused ceramic material, assembling the coated ribbons to a tightly compressed ribbon bundle, winding up said ribbon bundle to a coil, coating the sides of the coil with a finely distributed ceramic material, and sintering the resulting coil by heating, the ceramic material having a sintering temperature below the melting point of the metal of the ribbons.

PETER DÉNES.

REFERENCES CITED

The following references are of record in the file of this patent:

UNITED STATES PATENTS

| Number | Name | Date |
|---|---|---|
| 2,138,938 | Plensler | Dec. 6, 1938 |
| 2,236,861 | Widell | Apr. 1, 1941 |
| 2,307,018 | Cardell | Jan. 5, 1943 |
| 2,321,439 | Verwey | June 8, 1943 |
| 2,327,462 | Ruben | Aug. 24, 1943 |
| 2,386,634 | Robinson | Oct. 9, 1945 |
| 2,393,068 | Ruben | Jan. 15, 1946 |
| 2,421,652 | Robinson | June 3, 1947 |